TIME POSITION MEMORY CIRCUIT

Filed June 1, 1959 2 Sheets-Sheet 1

INVENTOR.
GUNTER SAGER
ANTHONY E. SOWERS

BY F. H. Henson

ATTORNEY 2,932,013

TIME POSITION MEMORY CIRCUIT

Gunter Sager, Fairport, and Anthony E. Sowers, Rochester, N.Y., assignors to General Dynamics Corporation, Rochester, N.Y., a corporation of Delaware Application June 1, 1959, Serial No. 817,220

4 Claims. (Cl. 340—174)

This invention relates in general to electronic switching systems and, more particularly, to time position memory circuits for use in electronic switching systems of the time division multiplex type.

In many computer and electronic switching system applications it is necessary that the time position of a particular pulse be stored or memorized by a circuit so that that circuit may produce a pulse in that same time position either during each succeeding pulse frame or whenever called upon to do so. Delay line and transistor flip-flop ring counter memory circuits have been proposed for this purpose but delay lines of the required accuracy are difficult to manufacture and transistor flip-flop ring counters are relatively expensive. Ring counters comprising magnetic core storage elements have not been used for this purpose prior to this invention since conventionally designed magnetic storage element ring counters cannot operate at the speed required in time division multiplex systems. To illustrate the speed of operation required, reference is made to copending application Serial Number 729,351, filed April 18, 1958, and assigned to the same assignee as the present invention, wherein the telephone lines of the system are interconnected by a plurality of transmission networks of the time division channel type. In the system disclosed in the above-identified application, each transmission network is divided into thirty-two time division channels and, since sampling of the lines is accomplished at a 12.5 kc. rate, the clock source or master pulse generator operates at a frequency of 400 kc. It is difficult to design a magnetic storage element ring counter to operate reliably at a 400 kc. rate primarily due to the fact that a magnetic storage element cannot read in information while a shift pulse is applied to the shift winding thereof and a delay must, therefore, be interposed between the reading out of a particular magnetic storage element and the reading in of the next succeeding magnetic storage element in a ring counter if shift pulses are simultaneously applied to the shift windings of all of the magnetic storage elements of the ring counter.

Accordingly, it is the general object of this invention to provide a new and improved time position memory circuit.

It is a more particular object of this invention to provide a new and improved pulse time position memory circuit which comprises magnetic storage elements as the principal elements thereof and which is reliable in operation.

The pulse time position memory circuit, which forms the subject matter of this invention and which is capable of memorizing the time position of any one of N time position defining pulses, comprises an N stage recycling magnetic storage element ring counter and first and second time position comparator circuits each comprising a magnetic storage element. In accordance with the invention, means is provided for generating first and second trains of shift pulses respectively corresponding to alternate ones of the clock pulses, which are also utilized to generate the time position defining pulses used throughout the system, the first train of shift pulses is continuously applied to the shift winding of the first comparator circuit magnetic storage element, and the second train of shift pulses is continuously applied to the shift winding of the second comparator circuit magnetic storage element. The selected time position defining pulse which is to be memorized is applied to the input windings of the first and second comparator circuit magnetic storage elements and to the input winding of the first magnetic storage element in the ring counter. Since the selected time position defining pulse occurs in phase with either a pulse in the first train of shift pulses or a pulse in the second train of shift pulses and since a magnetic storage element cannot be set when pulses are simultaneously applied to its input and shift windings, only one of the comparator circuit magnetic storage elements is triggered to its set condition while the first magnetic storage element of the ring counter is triggered to its set condition regardless of the time position of the selected pulse. If the first comparator circuit is triggered to its set condition, thus indicating that the selected pulse occurred in phase with a pulse in the second train of shift pulses, successive pulses in the second train of shift pulses are applied to the shift windings of the odd number magnetic storage elements of the ring counter and the pulses of the first train of shift pulses are applied to the shift windings of the even number storage elements of the ring counter. If the second comparator circuit is triggered to its set condition, thus indicating that the selected pulse occurred in phase with a pulse in the first train of shift pulses, succeeding pulses in the first train of shift pulses are applied to the shift windings of the odd number magnetic storage elements of the ring counter and the pulses of the second train of shift pulses are applied to the shift windings of the even number storage elements of the ring counter. Thus, the pulse which triggers the first ring counter magnetic storage element to its set condition is continuously advanced through the ring counter, and the pulse occurring in the output winding of the penultimate or N–1 magnetic storage element once each pulse frame corresponds in time position to the selected time position defining pulse.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise three figures on two sheets.

Figure 1:
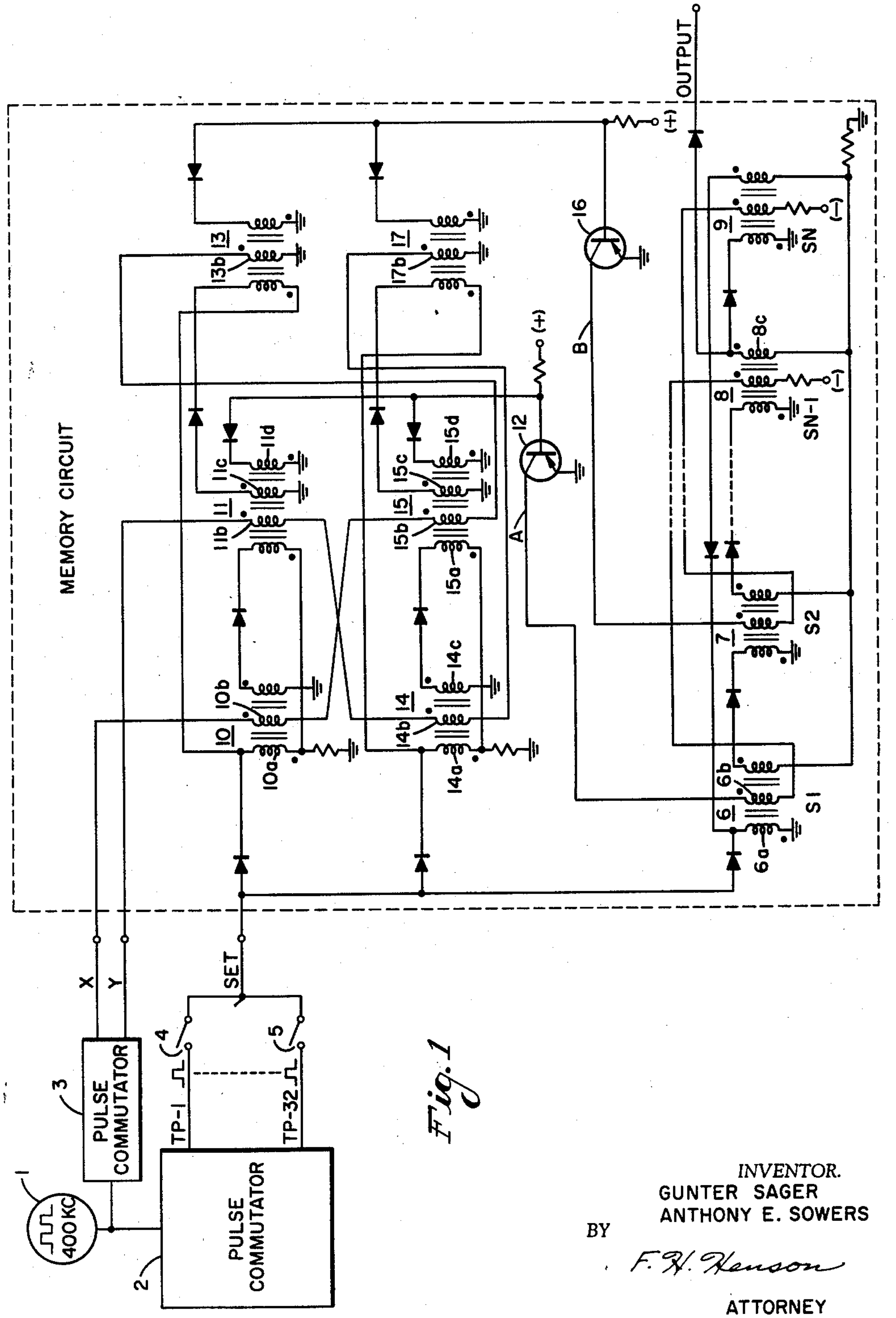
Fig. 1 shows a portion of an electronic switching system in block diagram form and circuit details of a time position memory circuit.

The memory circuit shown in Fig. 1 can be incorporated in a register or a link circuit of the types shown and described in the above-identified application. All circuits external to the memory circuit and which are utilized to control the operation of the memory circuit have been shown in block diagram or simplified form for the purpose of simplifying the disclosure and thus expediting the understanding of the invention.

As illustrated, the square wave generator or master pulse source 1 operates at 400 kc. and the output waveform from said generator is applied to pulse commutators 2 and 3. Pulse commutator 2 functions to commutate the pulses received from generator 1 to thirty-two output conductors, such as TP1–TP32, in turn, so that a time position defining pulse appears on each of said conductors at a 12.5 kc. rate. Since the output of generator 1 is a square waveform, each pulse appearing on each of the conductors TP1–TP32 is 1.25 microseconds in duration, there is a guard time of 1.25 microseconds between pulses on successive conductors, and each frame of pulses is eighty microseconds in duration. Similarly, commutator 3 functions to commutate the pulses received from generator 1 to two output conductors, X and Y, so that the pulses appearing on conductors X and Y respectively correspond to alternate ones of the pulses received from generator 1. Pulse generator 1 and pulse commutators 2 and 3 may be of any well known type but are preferably of the type shown and described in United States Patent 2,848,594, which is assigned to the same assignee as the present invention.

Manually operated switches, such as switches 4 and 5, have been shown for selectively applying a time position defining pulse to be memorized to the set terminal of the memory circuit. It is to be understood that in practice, the function of the manually operated switches is automatically performed by electronic devices. It is only necessary that a single pulse be applied to the set terminal of the memory circuit and the operated switch can then be restored. It should be obvious that by the momentary operation of any one of the thirty-two manually operated switches, represented by switches 4 and 5, any one of the thirty-two time position defining pulses can be selectively applied to the set terminal of the memory circuit.

The memory circuit comprises a ring counter having N, which in the illustrated case is thirty-two, magnetic storage elements corresponding to magnetic storage elements 6, 7, 8 and 9, a first time position comparator circuit comprising gated multivibrator magnetic storage elements 10 and 11, and magnetic storage element 13, a second time position comparator circuit comprising gated multivibrator magnetic storage elements 14 and 15, and magnetic storage element 17, and pulse amplifier transistors 12 and 16. Each of the conventionally designed magnetic storage elements comprises a core of magnetic material having two alternate states of magnetic stability respectively corresponding to set and reset conditions of the respective storage element, an input winding (*a*) which causes the storage element to assume its set condition when a pulse is applied thereto, a shift winding (*b*) which causes the storage element to assume its reset condition when a pulse is applied thereto, and an output winding (*c*) wherein voltage pulses are induced in response to changes in the magnetic state of the core. In addition, magnetic storage elements 11 and 15 of the first and second comparator circuits, respectively, each comprises an output winding (*d*) in which is induced pulses of opposite polarity from those induced in output winding (*c*). Preferably, the output and the shift windings comprise twice as many turns as the input windings of the magnetic storage elements. The memory circuit has been illustrated as designed for the condition in which positive-going pulses are used for both the setting and shifting operations. A dot is placed near one end of each of the storage element windings and indicates that the adjacent end of that winding has a negative polarity when a pulse is being read in by the associated core and a positive polarity when the associated core is being read out.

In the standby condition of the memory circuit, the magnetic storage elements of the ring counter and of the first and second comparator circuits are all in the reset condition and transistors 12 and 16 are biased for nonconduction. The pulses of the first train of shift pulses on conductor X are continuously applied to the shift windings of magnetic storage elements 10, 15 and 13 and the pulses of the second train of shift pulses on conductor Y are continuously applied to the shift windings of magnetic storage elements 11, 14 and 17. As is well known in the art, the shift pulses have no effect on the state of magnetization of the cores of the above-identified magnetic storage elements when those elements are in their reset condition.

Figure 2:
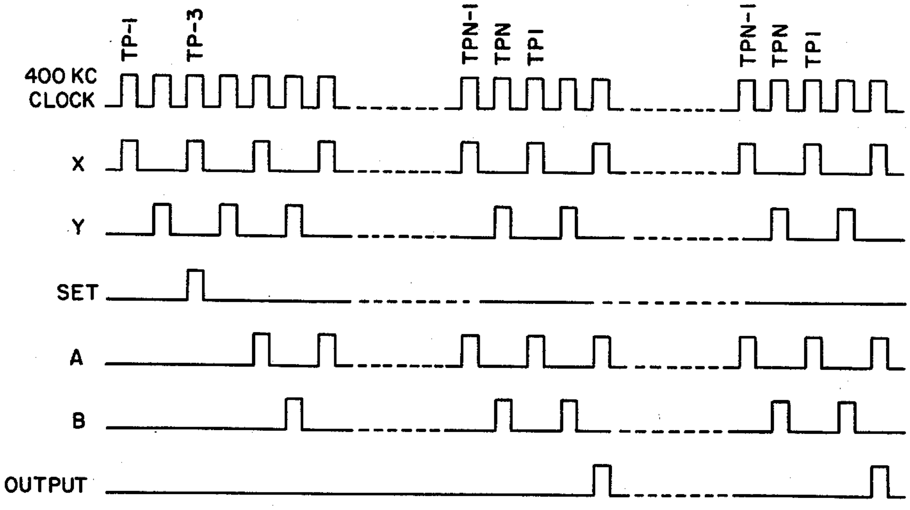
Figs. 2 and 3 are pulse charts which graphically illustrate the operation of the time position memory circuit of Fig. 1.

To illustrate the operation of the memory circuit, first assume that a time position pulse coincident with a pulse in the first train of shift pulses on conductor X is applied to the set terminal and thus to the input windings of magnetic storage elements 6, 10 and 14. Magnetic storage elements 6 and 14 are triggered to their set conditions but magnetic storage element 10 remains in its reset condition because a shift pulse is simultaneously applied to its shift winding. When the next pulse appears on conductor Y and is thus applied to shift winding 14*b* on magnetic storage element 14, element 14 is reset, and magnetic storage element 15 is set by the pulse induced in output winding 14*c* and coupled to input winding 15*a*. The next occurring pulse on conductor X, of course, resets magnetic storage element 15 to set magnetic storage elements 14 and 17, and the negative pulse occurring at the upper terminal of output winding 15*d* of magnetic storage element 15 renders transistor 12 conductive to apply a positive-going pulse to the shift windings of the odd number stages, as illustrated by stages S1 and SN–1, of the ring counter. When a shift pulse is applied to the shift winding 6*b* of magnetic storage element 6, magnetic storage element 6 is reset and magnetic storage element 7 assumes its set condition. The next occurring pulse on conductor Y serves to reset magnetic storage elements 14 and 17 and to set magnetic storage element 15. When magnetic storage element 17 resets, transistor 16 is rendered conductive to apply a positive-going pulse to the shift windings of the even number stages, as illustrated by stages S2 and SN, of the ring counter and thus advance the counter so that the third stage (not shown) assumes its set condition. The operation continues as just described. That is, shift pulses are applied to conductor A and thus to the shift windings of the odd number ring counter stages coincident with the first train of shift pulses on conductor X, and shift pulses are applied to conductor B and thus to the shift windings of the even number ring counter stages coincident with the second train of shift pulses on conductor Y, as illustrated in Fig. 2.

Figure 3:
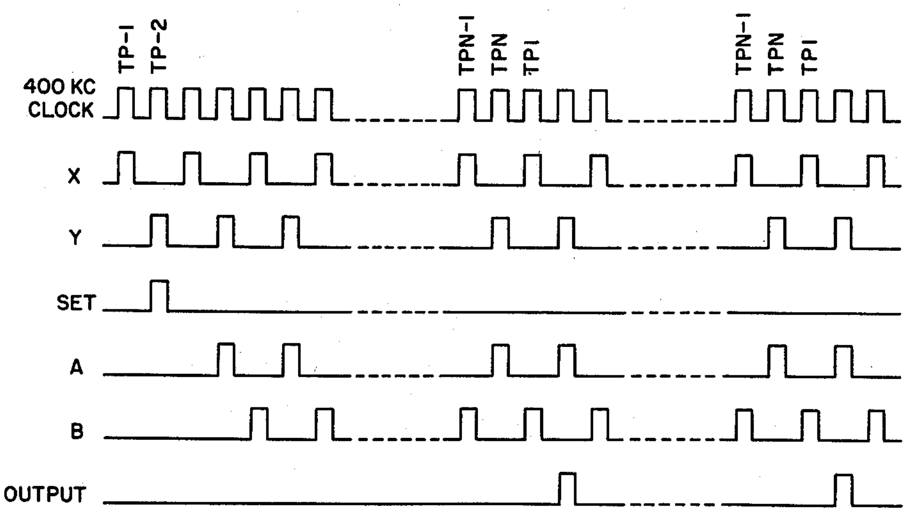

The operation is identical to that described above when the selected time position defining pulse corresponds in time position to a pulse in the second train of shift pulses on conductor Y with the exception that magnetic storage element 10 rather than magnetic storage element 14 assumes its set condition responsive to the application of the set pulse to the input windings of magnetic storage elements 10 and 14. Under these conditions, the gated multivibrator comprising magnetic storage elements 10 and 11 is activated and magnetic storage element 13 is triggered to its set condition each time that magnetic storage element 11 assumes its reset condition. Thus, the shift pulses applied to conductor A and thus to the shift windings of the odd number ring counter stages coincide with the second train of shift pulses on conductor Y, and the shift pulses applied to conductor B and thus to the shift windings of the even number ring counter stages coincide with the first train of shift pulses on conductor X, as illustrated in Fig. 3.

It can be seen that regardless of whether the selected time position defining pulse to be memorized occurs in the time position of a pulse in the first train of shift pulses on conductor X or a pulse in the second train of shift pulses on conductor Y, the succeeding pulses of the coincident train of shift pulses are applied to the shift windings of the odd number stages of the ring counter and the pulses of the non-coincident train of shift pulses are applied to the shift windings of the even number stages of the ring counter. Thus, the pulses appearing in the output winding 8*c* of the N–1 ring counter stage magnetic storage element 8 and which appear at the output terminal of the memory circuit are in the time position of the selected time position defining pulse which initiated the operation of the circuit. The memory circuit continues to generate a pulse in the memorized time position once each pulse frame until the circuit is reset. Although not shown, the memory circuit can be reset to its standby condition by the application of a pulse to a reset winding on each of the magnetic storage elements.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In combination, means for generating N time position defining pulses which recur in repetitive pulse frames, a pulse time position memory circuit comprising N cores of magnetic material having first and second stable states of magnetizations, an input winding on each core for controlling that core to assume its second state when a pulse is applied thereto, a shift winding on each core for controlling that core to return to its first state when a pulse is applied thereto, an output winding on each core, means for connecting said cores in a closed ring, said last named means comprising means for connecting the output winding on each core to the input winding on the next succeeding core so that each core assumes its second state when the preceding core returns to its first state, means for developing first and second trains of shift pulses respectively corresponding to alternate ones of said time position defining pulses, means for coupling a selected time position defining pulse to said memory circuit to establish the time position to be memorized, means for applying said selected pulse to the input winding on one of said cores to cause that core to assume its second state, means for applying said first train of shift pulses to the shift windings of the alternate cores including said one core and for applying said second train of shift pulses to the shift windings of the alternate cores not including said one core if said selected pulse corresponds in time position with a pulse in said first train of shift pulses, and means for applying said second train of shift pulses to the shift windings of the alternate cores including said one core and for applying said first train of shift pulses to the shift windings of the alternate cores not including said one core if said selected pulse corresponds in time position with a pulse in said second train of shift pulses.

2. In combination, means for generating N time position defining pulses which recur in repetitive pulse frames, a pulse time position memory circuit comprising N cores of magnetic material having first and second stable states of magnetization, an input winding on each core for controlling that core to assume its second state when a pulse is applied thereto, a shift winding on each core for controlling that core to return to its first state when a pulse is applied thereto, an output winding on each core, means for connecting the output winding on each core to the input winding of the next succeeding core and for connecting the output winding of the last core to the input winding of the first core of said N cores so that each core assumes its second state when the preceding core returns to its first state, means for developing first and second trains of shift pulses respectively corresponding to alternate ones of said time position defining pulses, means for coupling a selected time position defining pulse to said memory circuit to establish the time position to be memorized, means for applying said selected pulse to the input winding on said first core to cause said first core to assume its second state, means in said memory circuit for applying succeeding pulses of said first train of shift pulses to the shift windings on the odd number cores and the second train of shift pulses to the shift windings on the even number cores if said selected pulse corresponds in time position with a pulse in said first train of shift pulses, means in said memory circuit for applying succeeding pulses of said second train of shift pulses to the shift windings on the odd number cores and the first train of shift pulses to the windings on the even number cores if said selected pulse corresponds in time position with a pulse in said second train of shift pulses, and an output terminal for said memory circuit connected to the output winding on the penultimate core.

3. In combination, means for generating N time position defining pulses which recur in repetitive pulse frames, a pulse time position memory circuit comprising N magnetic storage elements each including a core of magnetic material having two alternate states of magnetic stability respectively corresponding to set and reset conditions of the respective storage element, an input winding on each core adapted to be pulsed for causing the respective storage element to assume its set condition, a shift winding on each core adapted to be pulsed for causing the respective storage element to assume its reset condition, an output winding on each core where in voltage pulses are induced in response to changes in the magnetic state of that core, means for connecting the output winding of each storage element to the input winding of the next succeeding storage element and for connecting the output winding of the last storage element to the input winding of the first storage element so that each storage element assumes its set condition when the preceding storage element assumes its reset condition, means for developing first and second trains of shift pulses respectively corresponding to alternate ones of said time position defining pulses, means for coupling a selected time position pulse to said memory circuit to establish the time position to be memorized, means for applying said selected pulse to the input winding of said first storage element to cause said first storage element to assume its set condition, means in said memory circuit for applying succeeding pulses of said first train of shift pulses to the shift windings of the odd number storage elements and the second train of shift pulses to the shift windings of the even number storage elements if said selected pulse corresponds in time position with a pulse in said first train of shift pulses, means in said memory circuit for applying succeeding pulses of said second train of shift pulses to the shift windings of the odd number storage elements and the first train of shift pulses tof the shift windings of said even number storage elements if said selected pulse corresponds in time position with a pulse in said second train of shift pulses, and an output terminal for said memory circuit connected to the output winding of the penultimate storage element.

4. In combination, means for generating N time position defining pulses which recur in repetitive pulse frames, a pulse time position memory circuit comprising a ring counter and first and second time position comparator circuits, said ring counter comprising N magnetic storage elements, each of said comparator circuits comprising a magnetic storage element, each of said magnetic storage elements including a core of magnetic material having two alternate states of magnetic stability respectively corresponding to set and reset conditions of the respective storage element, a shift winding on each core adapted to be pulsed for causing the respective storage element to assume its reset condition if that storage element is in its set condition, an input winding on each core adapted to be pulsed for causing the respective storage element to assume its set condition only if a pulse is not simultaneously applied to the shift winding of that storage element, an output winding on each core wherein voltage pulses are induced in response to changes in the magnetic state of that core, means for connecting the output winding of each storage element in said ring counter to the input winding of the next succeeding storage element in said ring counter and for connecting the output winding of the last storage element in said ring counter to the input winding of the first storage element in said ring counter so that each storage element in said ring counter assumes its set condition when the preceding storage element assumes its reset condition, means for developing first and second trains of shift pulses respectively corresponding to alternate ones of said time position defining pulses, means for continuously applying said first train of shift pulses to the shift winding of the first comparator circuit storage element, means for continuously applying said second train of shift pulses to the shift winding of the second comparator circuit storage element, means for coupling a selected time position defining pulse to said memory circuit to establish the time position to be memorized, means for applying said selected pulses to the input windings of said first and second comparator circuit storage elements and to the input winding of the first storage element in said ring counter, means responsive to the setting of said first comparator circuit storage element to its set condition for thereafter applying said second train of shift pulses to the shift windings of the odd number storage elements in said ring counter and the first train of shift pulses to the shift windings of the even number storage elements in said ring counter, means responsive to the setting of said second comparator circuit storage element to its set condition for thereafter applying said first train of shift pulses to the shift windings of the odd number storage elements in said ring counter and the second train of shift pulses to the shift windings of the even number storage elements in said ring counter, and an output terminal for said memory circuit connected to the output winding of the penultimate storage element in said ring counter.

No references cited.